(12) United States Patent
Chu et al.

(10) Patent No.: US 10,897,107 B2
(45) Date of Patent: Jan. 19, 2021

(54) SMART SOCKET

(71) Applicant: Yu-Hung Chu, Hsinchu County (TW)

(72) Inventors: Yu-Hung Chu, Hsinchu County (TW); Geng-You Liao, Taichung (TW)

(73) Assignee: Yu-Hung Chu, Hsinchu County (TW)

(*) Notice: Subject to any disclaimer, the term of this patent is extended or adjusted under 35 U.S.C. 154(b) by 0 days.

(21) Appl. No.: 16/497,590

(22) PCT Filed: May 22, 2017

(86) PCT No.: PCT/CN2017/085261
§ 371 (c)(1),
(2) Date: Sep. 25, 2019

(87) PCT Pub. No.: WO2018/213966
PCT Pub. Date: Nov. 29, 2018

(65) Prior Publication Data
US 2020/0021065 A1 Jan. 16, 2020

(51) Int. Cl.
H01R 13/66 (2006.01)
G05B 19/042 (2006.01)
H01R 13/52 (2006.01)

(52) U.S. Cl.
CPC .......... *H01R 13/66* (2013.01); *G05B 19/042* (2013.01); *H01R 13/5213* (2013.01)

(58) Field of Classification Search
CPC .. H01R 13/66; H01R 13/5213; H01R 31/065; H01R 13/6691; H01R 13/6683; G05B 19/042; G05B 2219/2642
See application file for complete search history.

(56) References Cited

U.S. PATENT DOCUMENTS

| 5,997,318 A | 12/1999 | Chou | |
| 2011/0006615 A1* | 1/2011 | Kim | H01R 31/065 307/131 |
| 2011/0098867 A1* | 4/2011 | Jonsson | H02J 13/0005 700/295 |
| 2015/0005900 A1* | 1/2015 | Steele | G05B 15/02 700/19 |

FOREIGN PATENT DOCUMENTS

| CN | 201937138 U | 8/2011 |
| CN | 202712646 U | 1/2013 |
| CN | 103296551 A | 9/2013 |
| CN | 203312501 U | 11/2013 |
| CN | 103682893 A | 3/2014 |
| CN | 204992170 U | 1/2016 |
| TW | M537338 U | 2/2017 |

* cited by examiner

Primary Examiner — Mohammad Ali
Assistant Examiner — Sheela Rao
(74) Attorney, Agent, or Firm — Muncy, Geissler, Olds & Lowe, P.C.

(57) ABSTRACT

A smart socket is provided, including a main body and a smart system. The main body has at least two slots, each of the at least two slots extends linearly along an extension direction, each of the at least two slots is for a pin of a plug to insert thereinto along an insertion direction and slidable along the extension direction, and the extension direction is perpendicular to the insertion direction. The smart system can communicate and interact with an electronic device, and the smart system can switch the electronic device on or off remotely.

9 Claims, 10 Drawing Sheets

SMART SOCKET

BACKGROUND OF THE INVENTION

Field of the Invention

The present invention relates to a smart socket.

Description of the Prior Art

Modern technological products are powered by electricity which is an essential power source in people's everyday life, and things like light bulbs, air conditioners, computers, motors and others need electricity to function. In addition, with the application of sockets, people can plug the plug of a product in the socket and start to use, and such socket is disclosed in TWM537338. In this type of sockets, most sockets have two insertion holes for two pins of a plug to insert therein, and some sockets have a third insertion hole for an earth line pin to insert therein.

With this type of plugs, a user can only use the insertion holes preset on the socket, and the user cannot adjust the insertion holes in accordance with various needs. However, there are different plug types or volumes, when a larger plug is plugged in, the plug will often cover the insertion hole of the neighboring socket, and the neighboring socket cannot be used. In addition, the user is unable to know the electricity consumption amount of this type of sockets, but considering that global warming and climate change getting worse and worse, it is important for us to know the electricity consumption situation and further to save energy and reduce carbon production.

The present invention has arisen to mitigate and/or obviate the afore-described disadvantages; that is, the user cannot adjust positions of the insertion holes of the socket according to various needs, and s/he is unable to know the electricity consumption amount of the electronic devices plugged in the socket.

SUMMARY OF THE INVENTION

To achieve the above and other objects, a smart socket is provided, including a main body and a smart system. The main body has an electrical connection unit and at least two plug-in units, the electrical connection unit is for being electrically connected with a power source, each of the at least two plug-in units has an electrical conduction unit and an insertion portion, the electrical conduction unit is electrically connected with the electrical connection unit, the insertion unit is for at least one plug to plug thereinto in an insertion direction to be electrically connected with the electrical conduction unit, wherein the insertion portion includes at least two slots, each of the two slots linearly extends along an extension direction, the extension direction is perpendicular to the insertion direction, each of the two slots is for a pin of the plug to plug thereinto in the insertion direction, and the pin of the plug is slidable along the extension direction.

The smart system is disposed to the main body and has a processor, a wireless communication module and at least two switch modules, the wireless communication module and the at least two switch modules are respectively and independently electrically connected with the processor, the wireless communication module is for being wirelessly communicated with a network system, the processor communicates with an electronic device through the wireless communication module, the at least two switch modules are controlled by the electronic device through the wireless communication module, a number of the at least two switch modules is equal to a number of the at least two plug-in units, the at least two switch modules are respectively electrically connected with and between the electrical conduction unit and the electrical connection unit of the at least two plug-in units, wherein the processor controls the switch module to turn on or off circuits of the electrical conduction unit and the electrical connection unit according to different signals from the electronic device.

The smart system includes a display and a storage device, the display and the storage device are respectively electrically connected with the processor, the storage device is for saving an electricity consumption information, the display is configured to receive and display an electricity consumption data of the storage device read by the processor, and the electricity consumption data includes at least one of an electricity consumption amount, a voltage value, a current value and an electricity consumption time.

The smart system includes a detection module and a warning module, the detection module and the warning module are respectively electrically connected with the processor, the processor is default to have an electricity consumption warning value, the detection module is for detecting electricity consumption data and returning the electricity consumption data to the processor, the electricity consumption data includes at least one of current value and a voltage value, and when the processor determines that the electricity consumption data is greater than the electricity consumption warning value, the processor activates the warning module.

The warning module includes a numeric warning information, and the numeric warning information is synchronously sent through the wireless communication module to the electronic device.

The smart system includes at least two automatic electrical interruption modules, the at least two automatic electrical interruption modules are respectively electrically connected with the processor, a number of the at least two automatic electrical interruption modules is equal to the number of the at least two plug-in units, the at least two automatic electrical interruption modules are respectively electrically connected with and between the electrical conduction unit of each of the at least two plug-in units and the electrical connection unit, each of the at least two automatic electrical interruption modules includes a current examiner and a breaker, the current examiner detects a current value of the electrical conduction unit and sends the current value to the processor, the processor is default to have a current safety value, and when the processor determines that the current value is greater than the current safety value, the processor drives the breaker to break a communication between the electrical conduction unit and the electrical connection unit.

The main body includes a box and a cover, the box defines an interior space, the electrical connection unit is disposed in the box, the electrical conduction unit is disposed in the interior space, and the insertion portion is disposed on the cover.

The electrical connection unit includes a first connector and an adapter, the first connector is disposed on the main body and electrically connected with the electrical conduction unit of each of the at least two plug-in units, the first connector is separatably plugged in and electrically connected with the adapter, the adapter has a second connector, the second connector is for being plugged in a universal socket, and a type of the second connector is different from a type of the first connector.

The electrical connection unit includes a first connector and an extension cord set, the first connector is disposed on the main body and electrically connected with the electrical conduction unit of each of the at least two plug-in units, the extension cord set includes a joint, a power cord and a universal plug, the first connector is separatably plugged in and electrically connected with the joint, and the universal plug is for being plugged in a universal socket.

The electrical connection unit includes a first connector and a connection seat, the first connector is disposed on the main body and electrically connected with the electrical conduction unit of each of the at least two plug-in units, the connection seat is for being disposed on a base and electrically connected with an internal power wiring in the base, and the first connector is separatably plugged in and electrically connected with the connection seat.

The smart system includes a display and a storage device, the display and the storage device are respectively electrically connected with the processor, the storage device is for saving an electricity consumption information, the display is configured to receive and display an electricity consumption data of the storage device read by the processor, and the electricity consumption data includes at least one of an electricity consumption amount, a voltage value, a current value and an electricity consumption time; the smart system includes at least two automatic electrical interruption modules, the at least two automatic electrical interruption modules are respectively electrically connected with the processor, a number of the at least two automatic electrical interruption modules is equal to the number of the at least two plug-in units, the at least two automatic electrical interruption modules are respectively electrically connected with and between the electrical conduction unit of each of the at least two plug-in units and the electrical connection unit, each of the at least two automatic electrical interruption modules includes a current examiner and a breaker, the current examiner detects a current value of the electrical conduction unit and sends the current value to the processor, the processor is default to have a current safety value, and when the processor determines that the current value is greater than the current safety value, the processor drives the breaker to break a communication between the electrical conduction unit and the electrical connection unit; the main body includes a box and a cover, the box defines an interior space, the electrical connection unit is disposed in the box, the electrical conduction unit is disposed in the interior space, and the insertion portion is disposed on the cover; the electrical connection unit includes a first connector, an adapter, an extension cord set, and a connection seat, the first connector is disposed on the main body and electrically connected with the electrical conduction unit of each of the at least two plug-in units, the first connector is separatably plugged in and electrically connected with the adapter, the adapter has a second connector, the second connector is for being plugged in a universal socket, and a type of the second connector is different from a type of the first connector; the extension cord set includes a joint, a power cord and a universal plug, the first connector is separatably plugged in and electrically connected with the joint, and the universal plug is for being plugged in a universal socket; the connection seat is for being disposed on a base and electrically connected with an internal power wiring in the base, and the first connector is separatably plugged in and electrically connected with the connection seat; a number of the at least two slots is three; the electrical conduction unit of each of the at least two plug-in units includes a first electrical conduction assembly, a second electrical conduction assembly and a third electrical conduction assembly, the first, second and third electrical conduction assemblies respectively respond to the three slots, one of the first and second electrical conduction assemblies is for being electrically connected with a phase line pin of the plug, the other of the first and second electrical conduction assemblies is for being electrically connected with a neutral line pin of the plug, and the third electrical conduction assembly is for being electrically connected with an earth line pin of the plug; each of the first electrical conduction assembly are independent and electrically unconnected; the cover and box are rectangular, and there are four said at least two plug-in units which are respectively disposed on four sides of the cover; the main body includes a protective member which is insulated, the protective member covers the cover and uncovers the display, the protective member is square O-shaped, the protective member has at least two longitudinal holes therethrough, and the at least two longitudinal holes respectively correspond to the at least two slots; the protective member is made of silicone; the cover has an insertion groove near each said insertion portion, the protective member has a plurality of engaging portions which correspond to the insertion portions, the engaging portion is engaged with the insertion portion to make the protective member positioned on the cover; the first connector is a three-pinned connector; the box has an assembling portion, the first connector is disposed on a bottom of the assembling portion, and the adapter is embedded in the assembling portion and connected to the first connector; the box has a plurality of heat-dissipation holes therethrough; the smart system has a circuit board and at least one USB charge module, the processor, each said automatic electrical interruption module, the display, the detection module, the warning module, each said switch module and each said USB charge module are respectively electrically connected with the circuit board.

In the smart socket of the present invention, the plug is slidable relative to the main body with the design of the slot, so the positions of the slots can be quickly adjusted according to different plug types and requirements, and a user does not need to use another socket. In addition, through the smart system and the electronic device which are communicable with each other, the user is able to know the electricity consumption status and turn the circuit on or off remotely.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
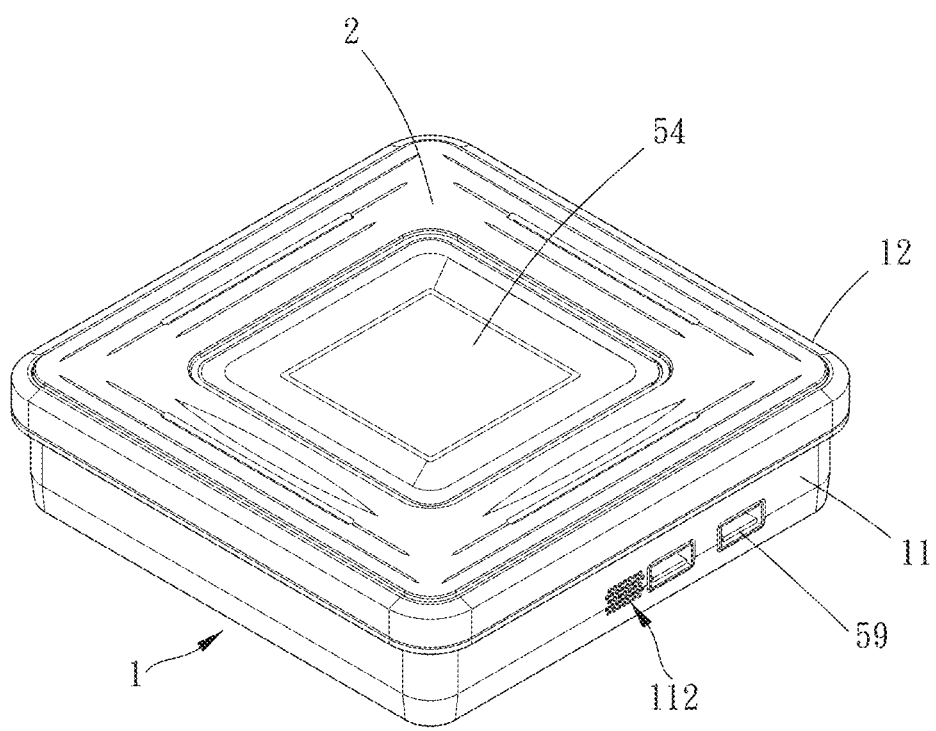
FIG. 1 is a stereogram of an embodiment of the present invention.
Figure 2:
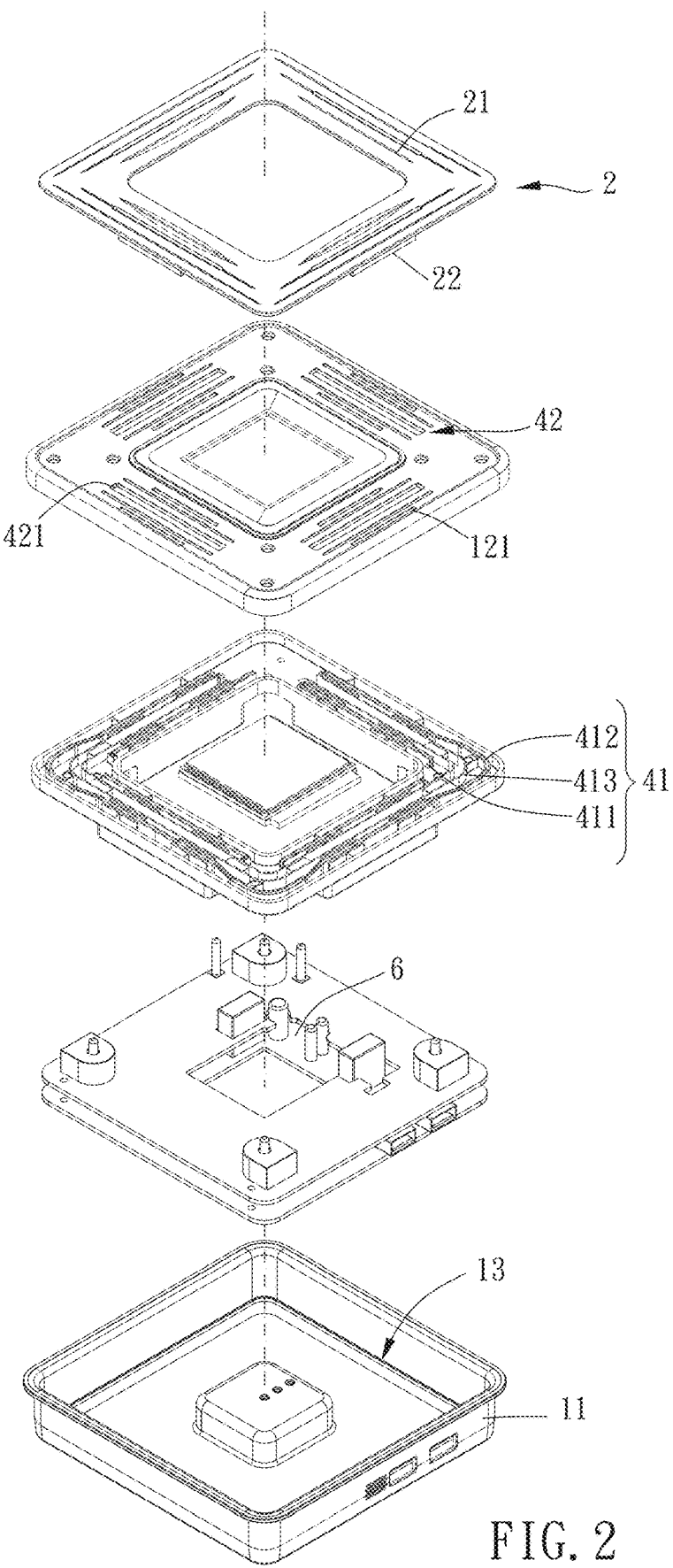
FIG. 2 is a breakdown view of FIG. 1.
Figure 3:
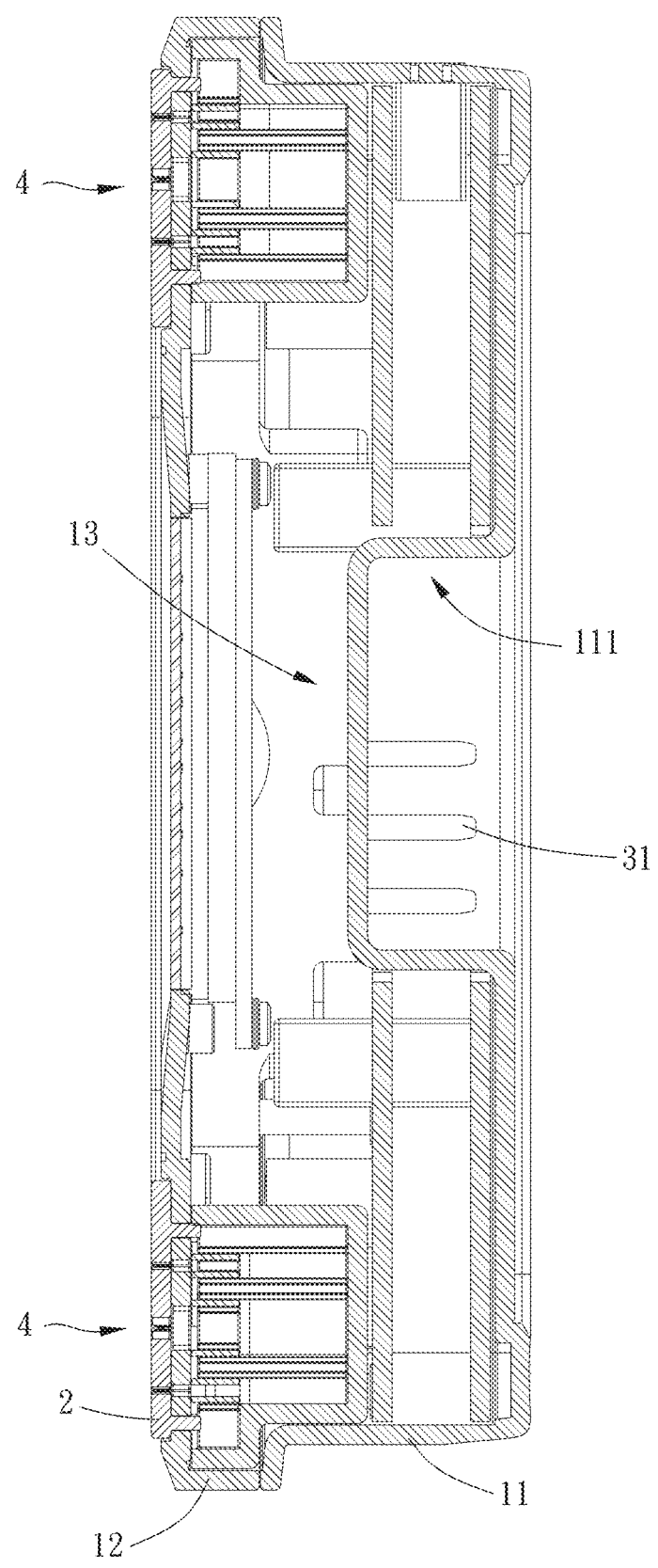
FIG. 3 is a cross-sectional view of FIG. 1.
Figure 4:
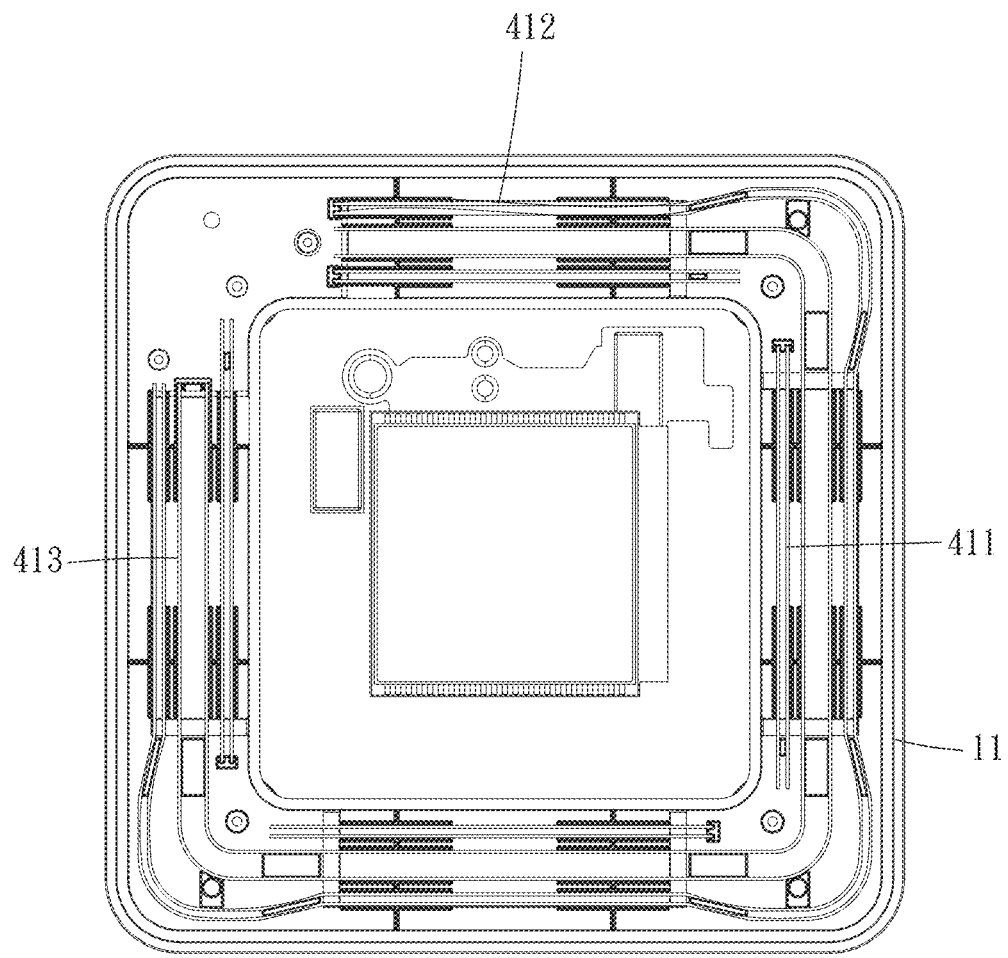
FIG. 4 is a top view of a partial assembly of FIG. 1.
Figure 5:
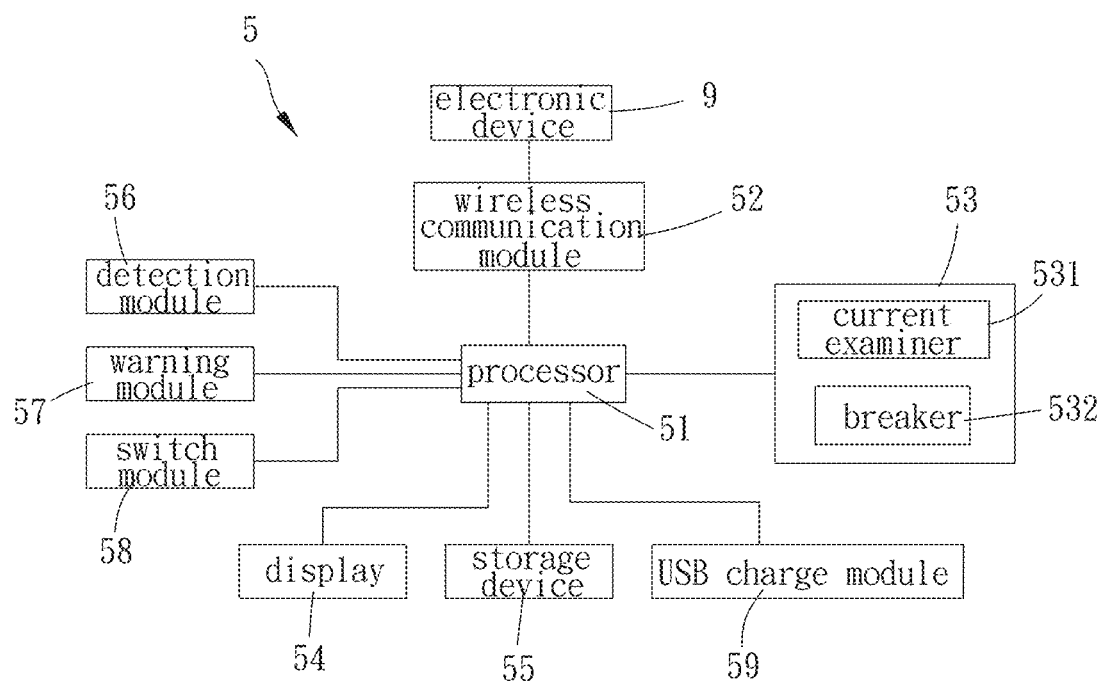
FIG. 5 is a system block diagram of a smart system.

The present invention will be clearer from the following description when viewed together with the accompanying drawings, which show, for purpose of illustrations only, the preferred embodiment in accordance with the present invention.

Please refer to FIGS. 1 to 10 for an embodiment of the present invention. The smart socket includes a main body 1 and a smart system 5.

Specifically, the main body 1 has an electrical connection unit 3 and at least two plug-in units 4, the electrical connection unit 3 is for being electrically connected with a power source (Figs. not shown), each of the at least two plug-in units 4 has an electrical conduction unit 41 and an insertion portion 42, the electrical conduction unit 41 is electrically connected with the electrical connection unit 3, the insertion unit 42 is for at least one plug 82 to plug thereinto in an insertion direction 71 to be electrically connected with the electrical conduction unit 41, wherein the insertion portion 42 includes at least two slots 421, each of the two slots 421 linearly extends along an extension direction 72, the extension direction 72 is perpendicular to the insertion direction 71, each of the two slots 421 is for a pin of the plug 82 to plug thereinto in the insertion direction 71, and the pin of the plug 82 is slidable along the extension direction 72.

When the plugs 82 is used at a time, a user can move the insertion portion 42 to a preferable position according to the type and size of the plug 82 (for example, type A, type B or adapter type) without moving the plug 82 to another socket.

Specifically, there are three of the at least two slots 421, and the three slots 421 are configured for the plug 82 (type A, type B and type J) to use. It is understandable that the electrical conduction unit 41 of each of the at least two plug-in units 4 includes a first electrical conduction assembly 411, a second electrical conduction assembly 412 and a third electrical conduction assembly 413, the first electrical conduction assembly 411, the second electrical conduction assembly 412 and the third electrical conduction assembly 413 respectively respond to the three slots 421, one of the first and second electrical conduction assemblies 411, 412 is for being electrically connected with a phase line pin 821 of the plug 82, the other of the first and second electrical conduction assemblies 411, 412 is for being electrically connected with a neutral line pin 822 of the plug 82, and the third electrical conduction assembly 413 is for being electrically connected with an earth line pin 823 of the plug 82. It is to be noted that in this embodiment, each said first electrical conduction assembly 411 is independent and electrically unconnected, so each said plug-in unit 4 can supply or interrupt electricity independently.

The smart system 5 is disposed to the main body 1 and has a processor 51, a wireless communication module 52 and at least two switch modules 58, the wireless communication module 52 and the at least two switch modules 58 are respectively and independently electrically connected with the processor 51, the wireless communication module 52 is for being wirelessly communicated with a network system (Wi-Fi), the processor 51 communicates with an electronic device 9 (for example, a mobile phone, a tablet or a laptop) through the wireless communication module 52, the at least two switch modules 58 are controlled by the electronic device 9 through the wireless communication module 52, a number of the at least two switch modules 58 is equal to a number of the at least two plug-in units 4, and the at least two switch modules 58 are respectively electrically connected with and between the electrical conduction unit 41 and the electrical connection unit 3 of the at least two plug-in units 4.

The processor 51 controls the switch module 58 to turn on or off circuits of the electrical conduction unit 41 and the electrical connection unit 3 according to different signals from the electronic device 9. Therefore, the user can turn on or off an electronic product remotely through an application on the electronic device 9 connecting with the processor 51. In addition, the user can obtain the electricity consumption data of the smart socket to further know the usage activity and electricity consumption amount of different electronic products, so the user can monitor the electronic products which consume more electricity in order to save energy and reduce carbon production.

Preferably, the smart system 5 includes a display 54 and a storage device 55, the display 54 and the storage device 55 are respectively electrically connected with the processor 51, the storage device 55 is for saving an electricity consumption information, the display 54 is configured to receive and display an electricity consumption data of the storage device 55 read by the processor 51, and the electricity consumption data includes at least one of an electricity consumption amount, a voltage value, a current value and an electricity consumption time. When the user is near the smart socket, s/he can obtain the electricity consumption information through the display 54, and it is understandable that the user can obtain the electricity consumption data through communicatively connecting the electronic device 9 and the processor 51.

Preferably, the smart system 5 includes a detection module 56 and a warning module 57, the detection module 56 and the warning module 57 are respectively electrically connected with the processor 51, the processor 51 is default to have an electricity consumption warning value, the detection module 56 is for detecting electricity consumption data and returning the electricity consumption data to the processor 51, and the electricity consumption data includes at least one of current value and a voltage value. When the processor 51 determines that the electricity consumption data is greater than the electricity consumption warning value, the processor 51 activates the warning module 57 to notify the user that the electronic product is currently in a more dangerous status and may malfunction. In this embodiment, the warning module 57 includes a numeric warning information, and the numeric warning information is synchronously sent through the wireless communication module 52 to the electronic device 9 to notify the user who is absent.

More preferably, the smart system 5 includes at least two automatic electrical interruption modules 53, the at least two automatic electrical interruption modules 53 are respectively electrically connected with the processor 51, a number of the at least two automatic electrical interruption modules 53 is equal to a number of the at least two plug-in units 4, and the at least two automatic electrical interruption modules 53 are respectively electrically connected with and between the electrical conduction unit 41 of each of the at least two plug-in units 4 and the electrical connection unit 3; therefore, when one of the at least two plug-in units 4 overloads and automatically breaks, a power supply of the other of the at least two plug-in units 4 will not be impacted, and the electronic product which is electrically connected with the other of the at least two plug-in units 4 still works.

Specifically, each of the at least two automatic electrical interruption modules 53 includes a current examiner 531 and a breaker 532, the current examiner 531 detects a current value of the electrical conduction unit 41 and sends the current value to the processor 51, the processor 51 is default to have a current safety value, and when the processor 51 determines that the current value is greater than the current safety value, the processor 51 drives the breaker 532 to break a communication between the electrical conduction unit 41 and the electrical connection unit 3.

In addition, the smart system 5 has a circuit board 6 and at least one USB charge module 59, the processor 51, each said automatic electrical interruption module 53, the display 54, the detection module 56, the warning module 57, each said switch module 58 and each said USB charge module 59 are respectively electrically connected with the circuit board 6. The at least one USB charge module 59 provides an electricity supply method which can be used without the plug 82, for example, the user can charge a mobile phone through a USB transmission line.

In this embodiment, the main body 1 includes a box 11 and a cover 12, the box 11 defines an interior space 13, the electrical connection unit 3 is disposed in the box 11, the electrical conduction unit 41 is disposed in the interior space 13, and the insertion portion 42 is disposed on the cover 12. In addition, the box 11 has a plurality of heat-dissipation holes 112 therethrough to release the heat generated by the resistance. Moreover, the cover 12 and the box 11 are rectangular, and there are four said plug-in units 4 which are respectively disposed on four sides of the cover 12.

Preferably, the main body 1 includes a protective member 2 which is insulated, the protective member 2 covers the cover 12 and uncovers the display 54, the protective member 2 is square O-shaped, the protective member 2 has at least two longitudinal holes 21 therethrough, and the at least two longitudinal holes 21 respectively correspond to the at least two slots 421 for the pins of the plug 82 to pass through.

Specifically, the protective member 2 is made of silicone, so the protective member 2 has great flexibility and insulation. More specifically, the cover 12 has an insertion groove 121 near each said insertion portion 42, the protective member 2 has a plurality of engaging portions 22 which correspond to the insertion portions 121, the engaging portion 22 is engaged with the insertion portion 121 to make the protective member 2 positioned on the cover 12.

Figure 6:
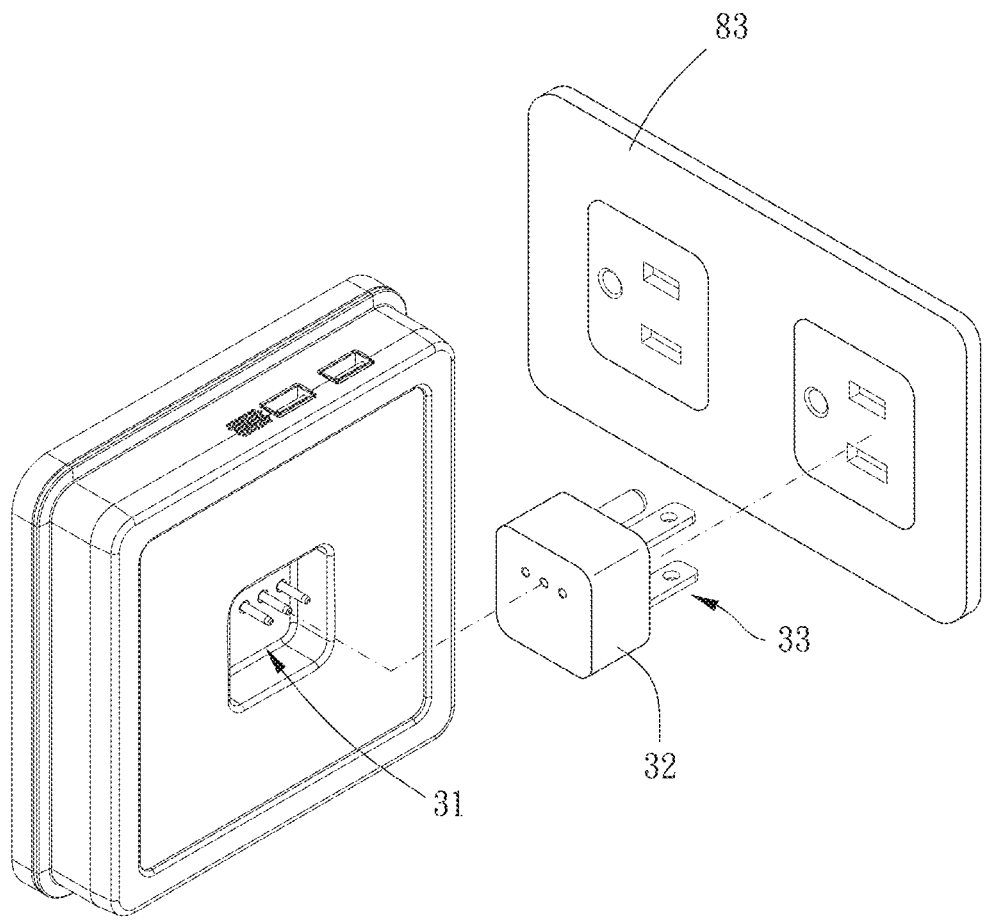
FIG. 6 is a drawing showing a first operation state of the embodiment of the present invention.
Figure 7:
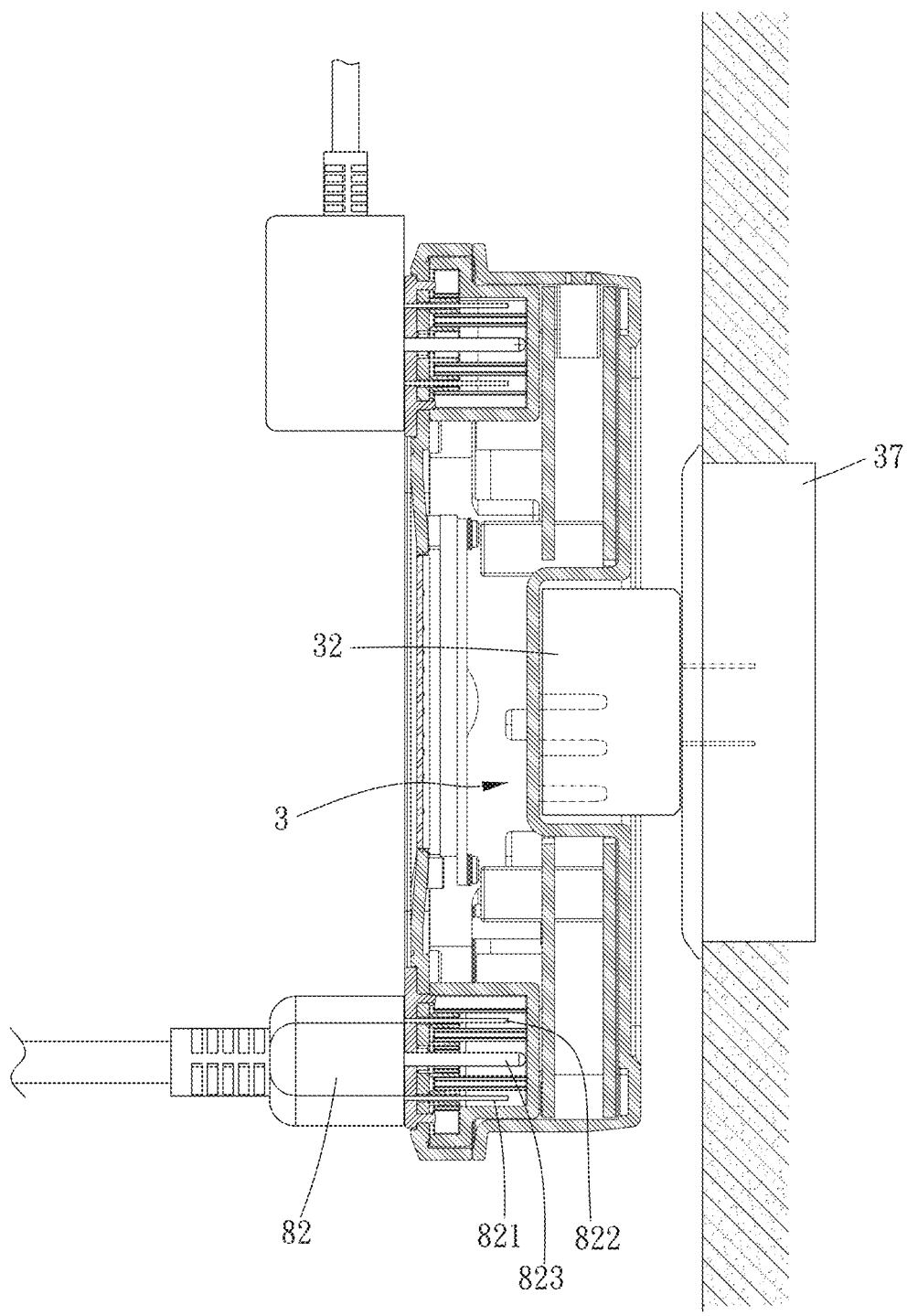
FIG. 7 is a cross-sectional view of a plug inserted of FIG. 6.
Figure 8:
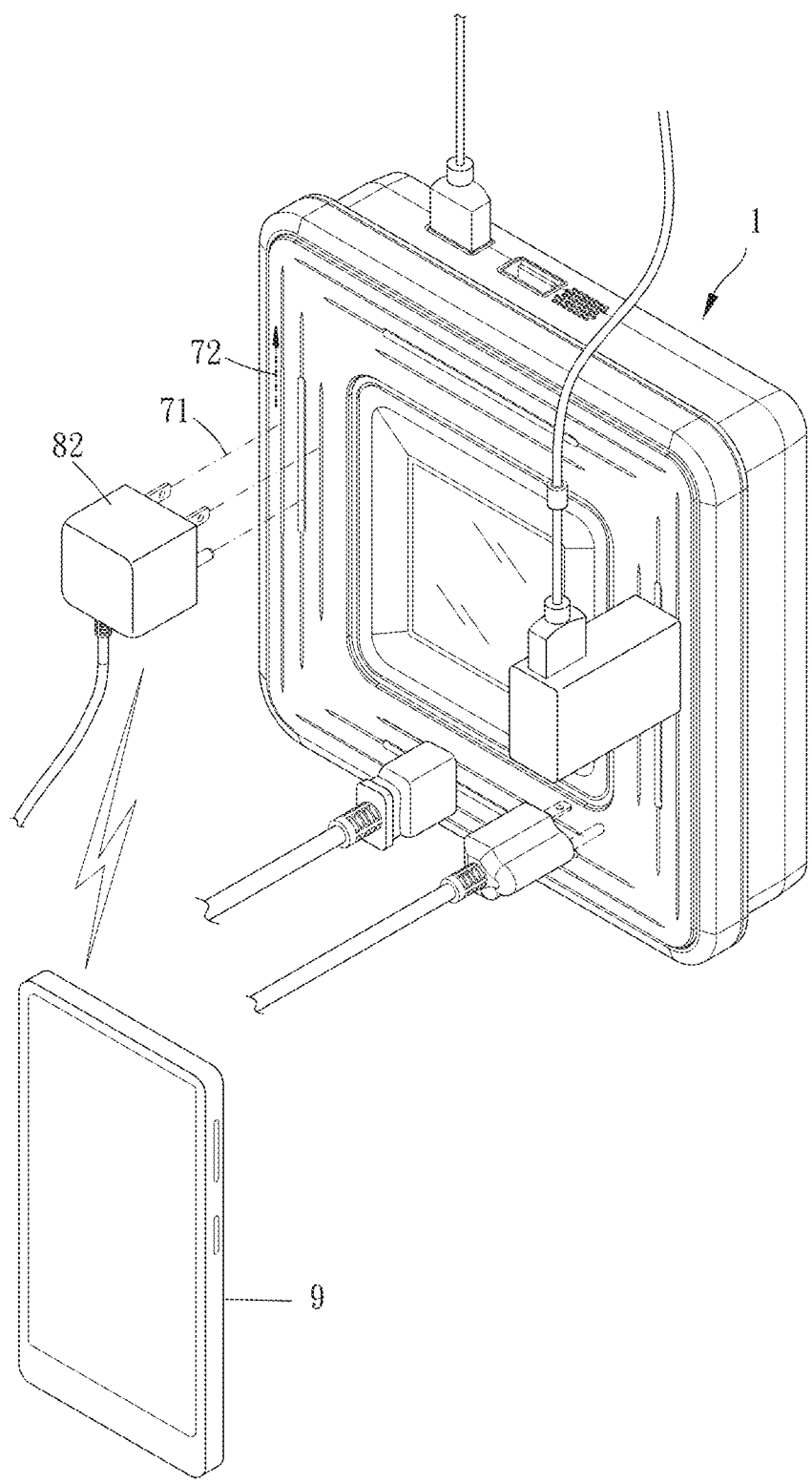
FIG. 8 is a stereogram of a plug inserted of FIG. 6.

It is to be noted that, the smart socket can have different embodiments according to the assemblies with which the smart socket matches, so please refer to FIGS. 6 to 8 for a first embodiment.

The electrical connection unit 3 includes a first connector 31 and an adapter 32, the first connector 31 is disposed on the main body 1 and electrically connected with the electrical conduction unit 41 of each of the at least two plug-in units 4, the first connector 31 is separatably plugged in and electrically connected with the adapter 32, the adapter 32 has a second connector 33, the second connector 33 is for being plugged in a universal socket 83, and a type of the second connector 33 is different from a type of the first connector 31. This way of application allows the smart socket to be quickly applied without changing the original wiring, so the smart socket can be easily taken around.

Specifically, the first connector 31 is a three-pinned connector, and when being used in Chinese Taiwan, the second connector 33 is type A or type B. The box 11 has an assembling portion 111, the first connector 31 is disposed on a bottom of the assembling portion 111, and the adapter 32 is embedded in the assembling portion 111 and connected to the first connector 31.

Figure 9:
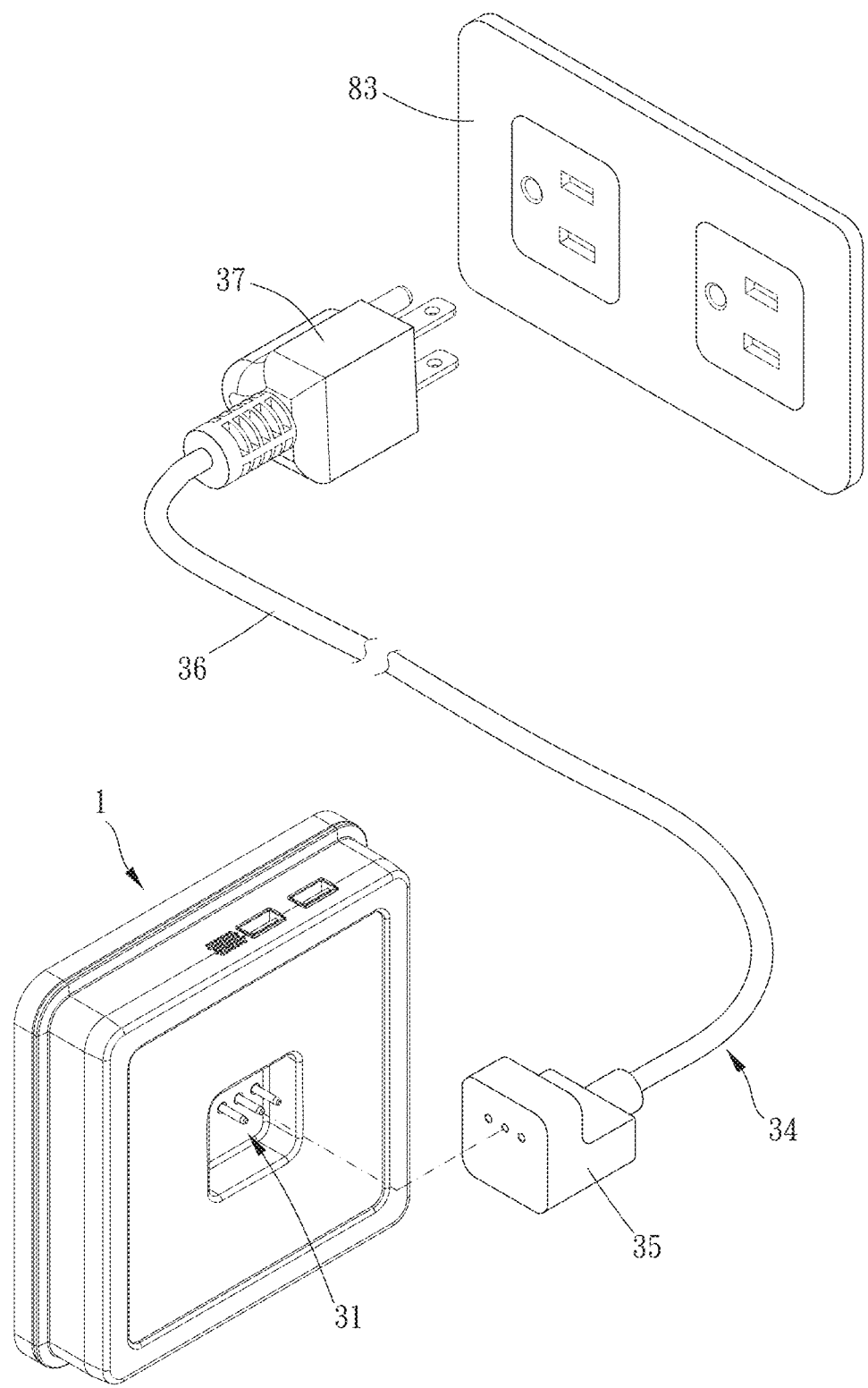
FIG. 9 is a drawing showing a second operation state of the embodiment of the present invention.

Please refer to FIG. 9 for a second embodiment. The electrical connection unit 3 further includes an extension cord set 34, the extension cord set 34 includes a joint 35, a power cord 36 and a universal plug 37, the first connector 31 is separatably plugged in and electrically connected with the joint 35, and the universal plug 37 is for being plugged in a universal socket 83. The second embodiment has the advantages of the first embodiment and also has the feature of extension cord, so the user can move the main body 1 to the position s/he wants.

Figure 10:
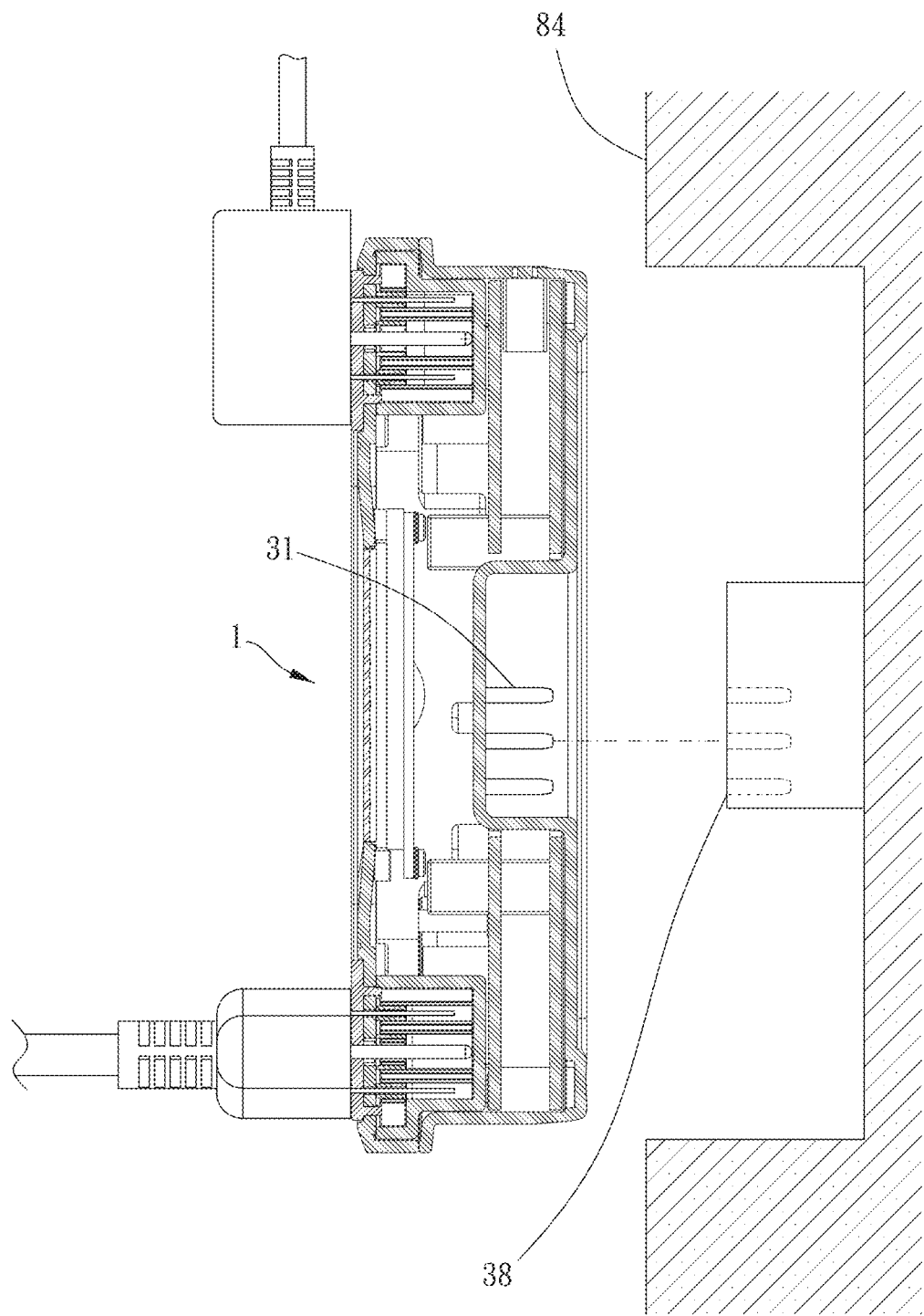
FIG. 10 is a drawing showing a third operation state of the embodiment of the present invention.

Please refer to FIG. 10 for a third embodiment. The electrical connection unit 3 further includes a connection seat 38, the connection seat 38 is for being disposed on a base 84 and electrically connected with an internal power wiring in the base 84, and the first connector 31 is separatably plugged in and electrically connected with the connection seat 83. This way of use can replace the universal socket 83, and when a part of the circuit is damaged and needs to be checked, the main body 1 can be quickly disassembled from the base 84. In addition, after the main body 1 is disassembled from the connection seat 38, the main body 1 can be assembled to the adapter 32 or the extension cord set 34; in other words, the user can quickly switch among the first to third embodiments.

Given the above, in the smart socket, the processor can be connected with the internet through the wireless communication mode of the smart system to communicate and send signals with the electronic device, so the user can obtain the electricity consumption data directly from the electronic device. In addition, the smart socket has the automatic electrical interruption module, so when the current passing through is over a certain amount, the automatic electrical interruption module will break immediately to protect the user. Moreover, the plug can slide randomly in the insertion portion, so when a plurality of plugs is plugged in, the user can move the plugs freely to the positions s/he wants.

While we have shown and described various embodiments in accordance with the present invention, it should be clear to those skilled in the art that further embodiments may be made without departing from the scope of the present invention.

What is claimed is:

1. A smart socket, comprising:
a main body, having an electrical connection unit and at least two plug-in units, the electrical connection unit for being electrically connected with a power source, each of the at least two plug-in units having an electrical conduction unit and an insertion portion, the electrical conduction unit being electrically connected with the electrical connection unit, the insertion unit being for at least one plug to plug thereinto in an insertion direction to be electrically connected with the electrical conduction unit, wherein the insertion portion includes at least two slots, each of the two slots linearly extends along an extension direction, the extension direction is perpendicular to the insertion direction, each of the two slots is for a pin of the plug to plug thereinto in the insertion direction, and the pin of the plug is slidable along the extension direction;
a smart system, disposed to the main body and having a processor, a wireless communication module and at least two switch modules, the wireless communication module and the at least two switch modules being respectively and independently electrically connected with the processor, the wireless communication module for being wirelessly communicated with a network system, the processor communicating with an electronic device through the wireless communication module, the at least two switch modules being controlled by the electronic device through the wireless communication module, a number of the at least two switch modules being equal to a number of the at least two plug-in units, the at least two switch modules being respectively electrically connected with and between the electrical conduction unit and the electrical connection unit of the at least two plug-in units, wherein the processor controls the switch module to turn on or off circuits of the electrical conduction unit and the electrical connection unit according to different signals from the electronic device;

wherein the smart system includes at least two automatic electrical interruption modules, the at least two automatic electrical interruption modules are respectively electrically connected with the processor, a number of the at least two automatic electrical interruption modules is equal to the number of the at least two plug-in units, the at least two automatic electrical interruption modules are respectively electrically connected with and between the electrical conduction unit of each of the at least two plug-in units and the electrical connection unit, each of the at least two automatic electrical interruption modules includes a current examiner and a breaker, the current examiner detects a current value of the electrical conduction unit and sends the current value to the processor, the processor is default to have a current safety value, and when the processor determines that the current value is greater than the current safety value, the processor drives the breaker to break a communication between the electrical conduction unit and the electrical connection unit.

2. The smart socket of claim 1, wherein the smart system includes a display and a storage device, the display and the storage device are respectively electrically connected with the processor, the storage device is for saving an electricity consumption information, the display is configured to receive and display an electricity consumption data of the storage device read by the processor, and the electricity consumption data includes at least one of an electricity consumption amount, a voltage value, a current value and an electricity consumption time.

3. The smart socket of claim 1, wherein the smart system includes a detection module and a warning module, the detection module and the warning module are respectively electrically connected with the processor, the processor is default to have an electricity consumption warning value, the detection module is for detecting electricity consumption data and returning the electricity consumption data to the processor, the electricity consumption data includes at least one of current value and a voltage value, and when the processor determines that the electricity consumption data is greater than the electricity consumption warning value, the processor activates the warning module.

4. The smart socket of claim 3, wherein the warning module includes a numeric warning information, and the numeric warning information is synchronously sent through the wireless communication module to the electronic device.

5. The smart socket of claim 4, wherein the smart system includes a display and a storage device, the display and the storage device are respectively electrically connected with the processor, the storage device is for saving an electricity consumption information, the display is configured to receive and display an electricity consumption data of the storage device read by the processor, and the electricity consumption data includes at least one of an electricity consumption amount, a voltage value, a current value and an electricity consumption time; the smart system includes at least two automatic electrical interruption modules, the at least two automatic electrical interruption modules are respectively electrically connected with the processor, a number of the at least two automatic electrical interruption modules is equal to the number of the at least two plug-in units, the at least two automatic electrical interruption modules are respectively electrically connected with and between the electrical conduction unit of each of the at least two plug-in units and the electrical connection unit, each of the at least two automatic electrical interruption modules includes a current examiner and a breaker, the current examiner detects a current value of the electrical conduction unit and sends the current value to the processor, the processor is default to have a current safety value, and when the processor determines that the current value is greater than the current safety value, the processor drives the breaker to break a communication between the electrical conduction unit and the electrical connection unit; the main body includes a box and a cover, the box defines an interior space, the electrical connection unit is disposed in the box, the electrical conduction unit is disposed in the interior space, and the insertion portion is disposed on the cover; the electrical connection unit includes a first connector, an adapter, an extension cord set, and a connection seat, the first connector is disposed on the main body and electrically connected with the electrical conduction unit of each of the at least two plug-in units, the first connector is separatably plugged in and electrically connected with the adapter, the adapter has a second connector, the second connector is for being plugged in a universal socket, and a type of the second connector is different from a type of the first connector; the extension cord set includes a joint, a power cord and a universal plug, the first connector is separatably plugged in and electrically connected with the joint, and the universal plug is for being plugged in a universal socket; the connection seat is for being disposed on a base and electrically connected with an internal power wiring in the base, and the first connector is separatably plugged in and electrically connected with the connection seat; a number of the at least two slots is three; the electrical conduction unit of each of the at least two plug-in units includes a first electrical conduction assembly, a second electrical conduction assembly and a third electrical conduction assembly, the first, second and third electrical conduction assemblies respectively respond to the three slots, one of the first and second electrical conduction assemblies is for being electrically connected with a phase line pin of the plug, the other of the first and second electrical conduction assemblies is for being electrically connected with a neutral line pin of the plug, and the third electrical conduction assembly is for being electrically connected with an earth line pin of the plug; each of the first electrical conduction assembly are independent and electrically unconnected; the cover and box are rectangular, and there are four said at least two plug-in units which are respectively disposed on four sides of the cover; the main body includes a protective member which is insulated, the protective member covers the cover and uncovers the display, the protective member is square O-shaped, the protective member has at least two longitudinal holes therethrough, and the at least two longitudinal holes respectively correspond to the at least two slots; the protective member is made of silicone; the cover has an insertion groove near each said insertion portion, the protective member has a plurality of engaging portions which correspond to the insertion portions, the engaging portion is engaged with the insertion portion to make the protective member positioned on the cover; the first connector is a three-pinned connector; the box has an assembling portion, the first connector is disposed on a bottom of the assembling portion, and the adapter is embedded in the assembling portion and connected to the first connector; the box has a plurality of heat-dissipation holes therethrough; the smart system has a circuit board and at least one USB charge module, the processor, each said automatic electrical interruption module, the display, the detection module, the warning module, each said switch module and each said USB charge module are respectively electrically connected with the circuit board.

6. The smart socket of claim 1, wherein the main body includes a box and a cover, the box defines an interior space, the electrical connection unit is disposed in the box, the electrical conduction unit is disposed in the interior space, and the insertion portion is disposed on the cover.

7. The smart socket of claim 1, wherein the electrical connection unit includes a first connector and an adapter, the first connector is disposed on the main body and electrically connected with the electrical conduction unit of each of the at least two plug-in units, the first connector is separatably plugged in and electrically connected with the adapter, the adapter has a second connector, the second connector is for being plugged in a universal socket, and a type of the second connector is different from a type of the first connector.

8. The smart socket of claim 1, wherein the electrical connection unit includes a first connector and an extension cord set, the first connector is disposed on the main body and electrically connected with the electrical conduction unit of each of the at least two plug-in units, the extension cord set includes a joint, a power cord and a universal plug, the first connector is separatably plugged in and electrically connected with the joint, and the universal plug is for being plugged in a universal socket.

9. The smart socket of claim 1, wherein the electrical connection unit includes a first connector and a connection seat, the first connector is disposed on the main body and electrically connected with the electrical conduction unit of each of the at least two plug-in units, the connection seat is for being disposed on a base and electrically connected with an internal power wiring in the base, and the first connector is separatably plugged in and electrically connected with the connection seat.

* * * * *